United States Patent [19]
Letoquart et al.

[11] Patent Number: 4,757,320
[45] Date of Patent: Jul. 12, 1988

[54] METHOD AND DEVICE FOR THE RADIOELECTRIC SYNCHRONIZATION OF SLAVE STATIONS BY A MASTER STATION, ESPECIALLY FOR A MICROWAVE LANDING CONTROL SYSTEM

[75] Inventors: Bruno Letoquart, Savigny le Temple; Joseph Hetyei, Bouffemont, both of France

[73] Assignee: Thomson-CSF, Paris, France

[21] Appl. No.: 807,669

[22] Filed: Dec. 11, 1985

[30] Foreign Application Priority Data

Dec. 14, 1984 [FR] France ............... 84 19195

[51] Int. Cl.$^4$ ............................................. G01S 1/16
[52] U.S. Cl. ...................................... 342/410; 342/35
[58] Field of Search ............... 343/407, 408, 409, 410, 343/411, 412, 5 LS; 342/35, 31, 385, 386, 387, 388

[56] References Cited

U.S. PATENT DOCUMENTS

| 2,612,601 | 9/1952 | Musselman | 342/388 |
| 2,646,510 | 7/1953 | Musselman | 342/387 |
| 2,794,979 | 6/1957 | Palmer | 342/388 |
| 2,946,019 | 7/1960 | Frank | 342/388 |
| 3,250,896 | 5/1966 | Perkinson et al. | 342/31 |
| 3,262,111 | 7/1966 | Graham | 342/31 |
| 3,414,900 | 12/1968 | Steinhauser | 342/386 |
| 3,440,652 | 4/1969 | Bates et al. | 342/31 |
| 3,715,757 | 2/1973 | Toman | 343/407 |
| 3,801,981 | 4/1974 | Alpers | 343/7.5 |
| 3,868,691 | 2/1975 | Miller et al. | 342/389 |
| 3,973,261 | 8/1976 | Phipps . | |
| 3,979,752 | 9/1976 | Charlot | 342/201 |
| 4,166,275 | 8/1979 | Michaels et al. | 342/389 |
| 4,193,073 | 3/1980 | Kohaen | 342/125 |
| 4,333,081 | 6/1982 | Höfgen | 343/407 |
| 4,533,871 | 8/1985 | Boetzkes | 342/46 |
| 4,568,942 | 2/1986 | Letoquart | 342/35 |

FOREIGN PATENT DOCUMENTS

0082770 6/1983 European Pat. Off. .

Primary Examiner—Theodore M. Blum
Assistant Examiner—D. Cain
Attorney, Agent, or Firm—Oblon, Fisher, Spivak, McClelland & Maier

[57] ABSTRACT

A method for the radioelectric synchronization of slave stations by a master station, especially for a MLS type landing control system. The method consists in transmitting by the azimuth station a synchronization data coded in the form of a series of short duration pulses, prior to each MLS cycle, a cycle being constituted by a plurality of successive transmission of MLS functions.

7 Claims, 5 Drawing Sheets

FIG_1

FIG_4

FIG_5

FIG_8

FIG_9

FIG_10

METHOD AND DEVICE FOR THE RADIOELECTRIC SYNCHRONIZATION OF SLAVE STATIONS BY A MASTER STATION, ESPECIALLY FOR A MICROWAVE LANDING CONTROL SYSTEM

BACKGROUND OF THE INVENTION

1. Field of the Invention

The present invention concerns a method for the radioelectric synchronization of slave stations by a master station. This method is particularly usable to the synchronization of azimuth and elevation (or bearing) stations of a Microwave Landing System (MLS). The invention also concerns devices for reducing to practice this method.

2. Description of the Prior Art

It will be recalled that a MLS supplies an aircraft with different data called "functions" as to its position, especially its angle of azimuth and its angle of elevation in relation to the landing runway reference system. The MLS may further supply other associated functions such as the rear azimuth, for example, and a certain number of data, some of which are called "basic data" and others of which are called "auxiliary data". These data are alternately transmitted by the MLS from the ground in time multiplexing upon a single frequency, close to 5 GHz, according to the specifications standardized by the International Civil Aviation Organization (OACI), annex 10, paragraph 3-eleven.

Each of the data transmitted, especially as to the azimuth and to the elevation, is divided into two successively transmitted parts:

a preamble, the main role of which is to supply the aircraft with identification of the transmission that will immediately follow. This preamble is transmitted by a sectorial antenna, i.e. an antenna having a stationary radiation diagram covering the whole of the zone, or sector, covered by the MLS. The preamble is a binary word transmitted in Differential Phase Shift Keying (DPSK) according the OACI standards;

angular data per se, transmitted by means of an electronic scanning antenna, according to the well-known Time Reference Scanning Beam (TRSB) procedure.

Figure 1:
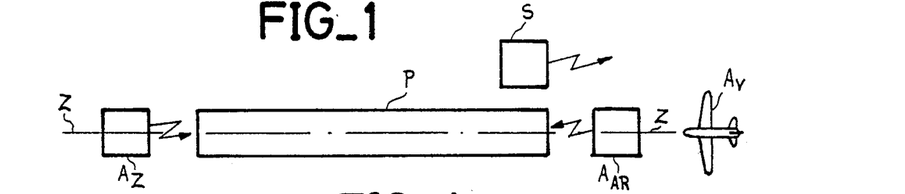
FIG. 1, a usual disposition of the azimuth, elevation and rear azimuth stations near a landing runway.

FIG. 1 represents a usual disposition of the azimuth, elevation and rear azimuth stations near a landing runway.

The azimuth and elevation stations are generally positioned with respect to one another at a distance of several kilometers apart. The azimuth station (Az) is close to the end of the runway, marked P and having axis ZZ, and it transmits in the direction of the runway P thus allowing the aircraft (Av) to dispose of the angular azimuth data during the entire landing operation, even during the rolling onto the runway phase. The elevation station (S) transmits in the same direction but it is on the contrary close to the runway threshold, allowing the aircraft (Av) to be guide-controlled onto a path at a constant angle of elevation during landing and to be brought by this path upon entry of the runway. The rear azimuth station ($A_{AR}$) is positioned at the runway entry, so as to be symmetrical to the azimuth station Az, and also transmits in the direction of the runway. Time-sharing operation upon a single frequency thus necessitates the existence of a time synchronizing link between the stations, in order to ensure the non-overlapping of the azimuth, elevation and rear azimuth transmissions.

Figure 2:
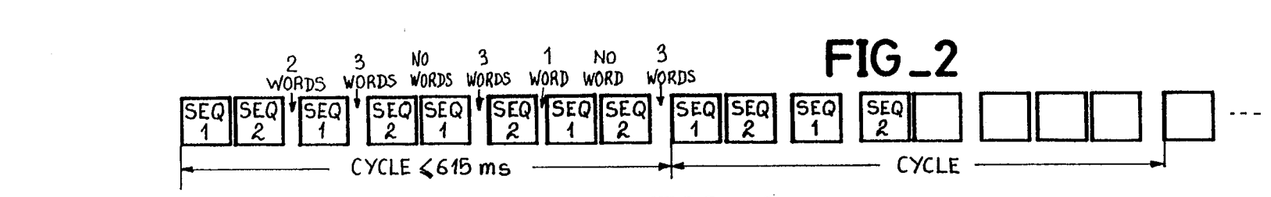
FIG. 2, an example of an OACI time sequence.

FIG. 2 represents an embodiment of a complete OACI time sequence transmitted by a MLS.

The sequence is formed of a succession of identical "cycles" having a maximum duration of 615 ms. Each cycle itself is divided into a succession of 37 sequences" and of auxiliary data words.

Figure 3A:
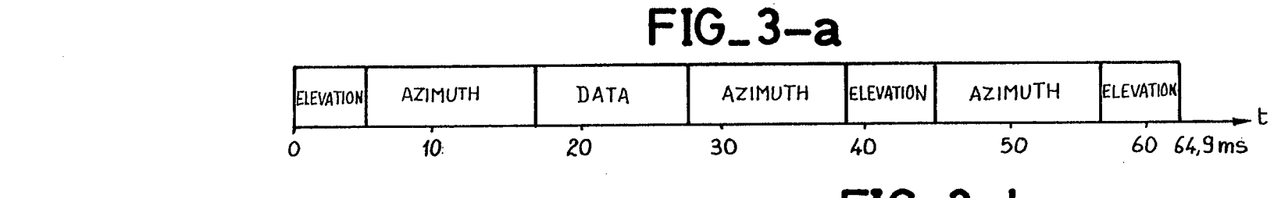
FIGS. 3a and 3b, examples of sequences of FIG. 2.
Figure 3B:
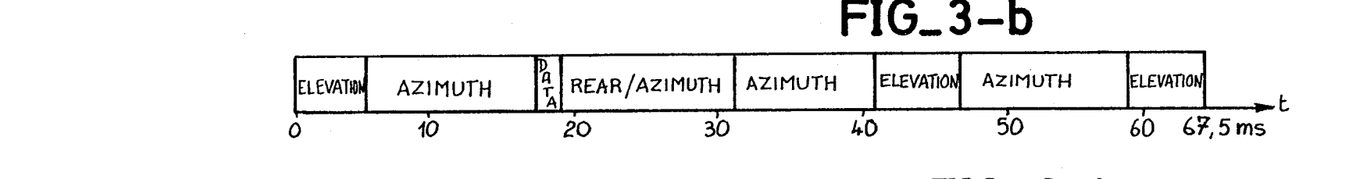

FIGS. 3a and 3b, represent respectively two particular examples of what is called "sequence", of types bearing references 1 and 2.

In these two types, a sequence comprises a succession of time durations reserved respectively for the azimuth, for the elevation, for the rear azimuth and for the basic data.

The purpose of the synchronization is to ensure that the different functions, azimuth, elevation, rear azimuth, are transmitted within the time duration allocated thereto. Generally, the azimuth station acts as master station by generating the MLS cycle. In order to do this, the master station must send synchronization signals towards the other stations in order to allow them to transmit when required.

This synchronization can be carried out through a physical link, electric cable or optical fiber, for example. But it thus presents the drawback of being costly due to the civil engineering works that it requires, especially for the construction of trenches over distances which may reach several kilometers. This is the reason why it appears more worthwhile to carry out this synchronization through radioelectric means.

One solution to carry out this radioelectric synchronization uses go and return scanning of the scanning beam of the azimuth station. The principles of the scanning beam are already mentioned herein-above and will be described in further detail herein-below, with reference to FIGS. 3 and 4 which illustrates the principles of the respective transmissions in azimuth and in elevation.

Figure 4:
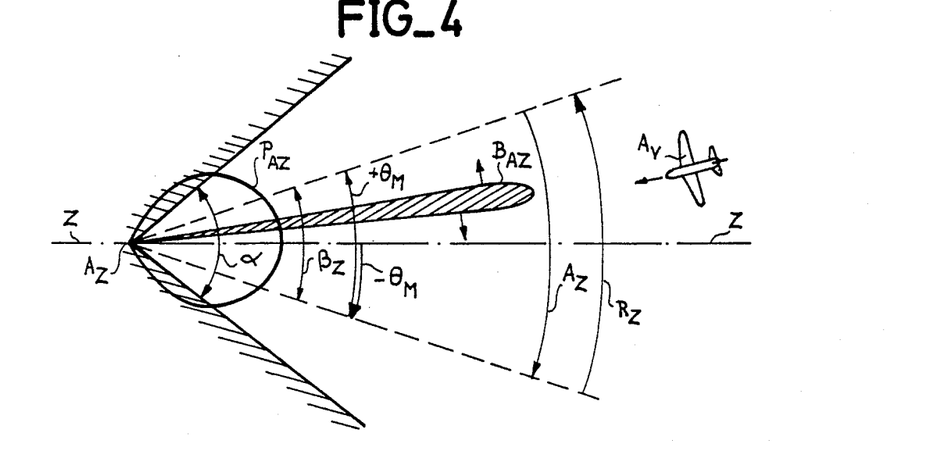
FIG. 4, an explanation diagram of the operation of an azimuth station.

From the azimuth station, according to what is set out herein-above, are transmitted two different radiations by two distinct antennae, which, for enhanced simplicity, have been represented on the same point $A_Z$ in FIG. 4. From point $A_Z$ there is represented the diagram of the preamble transmission, reference $P_{AZ}$, transmitted by the sectorial antenna within the entire covering zone of the MLS system, which is represented in the drawing by an angle $\alpha$. From this point $A_Z$, there is further represented the diagram of a flat and vertical beam $B_{AZ}$, called scanning beam, transmitted by an electronic scanning antenna. The beam $B_{AZ}$ performs at constant speed a first scanning then, after a dead time, a return scanning, and this occurs within a scanning zone forming an angle $\beta_Z$ on FIG. 4, which can be equal to or smaller than the previous covering angle $\alpha$. In FIG. 4, $\beta_Z$ has been represented smaller than $\alpha$; and an arrow $R_Z$ represents respectively the outward and inward scanning paths of the beam $B_{AZ}$ within scanning zone $\beta_Z$. An aircraft $A_V$ has been represented by way of example in an incorrectly aligned position relative to the axis ZZ of the runway.

According to the OACI standards, the angle $\beta_Z$ is comprised between a minimum of 20°, being divided with respect to the axis of runway ZZ into the semi-angles $-\theta_M = +\theta_M = 10°$, and a maximum of 120° maximum with $-\theta_M = +\theta_M = 60°$. The beam $B_{AZ}$ has an aperture of 1 to 4% in the plane of the figure and of about 15° in the vertical plane.

Figure 5:
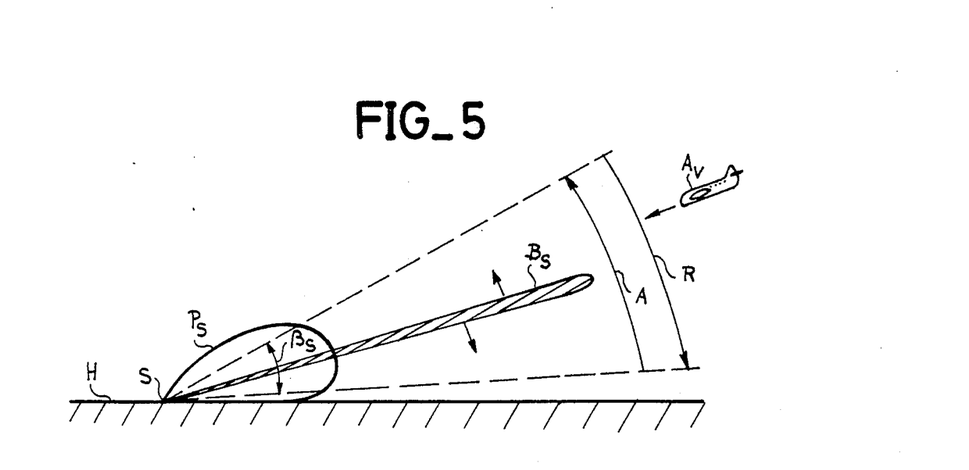
FIG. 5, an explanation diagram of the operation of an elevation station.

FIG. 5 represents, in a manner analogous to that represented in FIG. 4, the principle of the elevation transmission.

FIG. 5 therefore shows the elevation station S from which are transmitted two beams by two distinct antennae. The sectorial antenna transmits the elevation preamble $P_S$ of which the diagram has been represented in the drawing. The other transmits a flat scanning beam $B_S$, scanning the scanning zone of angle marked $\beta_S$. This scanning is performed in the same way as for the azimuth scanning beam $B_{AZ}$.

In this first type of solution, the go and return scanning of the scanning beam of the azimuth station, that compulsorily passes onto the elevation station, is used for the synchronization of this latter station. This implies that the elevation station be equipped, furthermore, with:

a receiving antenna, operating at about 5 GHz according to OACI standards, directed towards the azimuth station so as to pick-up the scanning beam of this station when it passes;

receiving means, operating at about 5 GHz, detecting the pulses sent by the scanning beam from the azimuth station;

logic means for monitoring the transmission sequences;

a clock of high precision and stability for ensuring the operating autonomy of the elevation station, even in the presence of temporary shut-down of receiving the signal transmitted by the azimuth station;

logic means for performing the transmission of the sequences appropriate to the elevation station in the event of temporary loss of synchronization data.

A first type of drawback inherent in this solution arises from the rounded shape and the considerable width of the pulses obtained by the passages of the scanning beam $B_{AZ}$ upon the elevation station (50 to 200 $\mu$s), the too-slow fronts of which do not allow to obtain good precision upon the arrival time of the pulse, a precision which is desired to be in the order of a few $\mu$s.

A second type of drawback arises from the need for very complex logic means in order to monitor the transmission sequences, taking into account the fact that the azimuth and elevation sequences follow one another in an irregular way in a MLS cycle, thereby compelling the slave stations (elevation station) to distinguish them from one another.

A second solution to the problem of the radioelectric synchronization of the elevation station by the azimuth station consists in using the preamble transmitted by the azimuth station. In this case, the elevation station must comprise the same supplementary means as in the first type of solution, with the exception that the receiving means must now decode the DPSK modulated transmissions.

Here again, this type of solution presents drawbacks, including the necessity of having a very sensitive MLS receiver, due to the fact that the transmission of the preamble by the sectorial antenna is carried out at a lower level than the transmission by the scanning antenna, and the complexity of the receiver that must be able to decode the DPSK modulation.

An object of the present invention is to overcome these various drawbacks. According to the invention, there is provided a method for the radioelectric synchronization of at least one slave station by a master station in a data communication system, comprising a plurality of successive steps of data transmission by said stations, said steps constituting a cycle, the method comprising a supplementary radioelectric transmission step by the said master station of a synchronization data coded in the form of a plurality of successive pulses, said synchronization data being periodically transmitted, at least once per cycle.

BRIEF DESCRIPTION OF THE DRAWINGS

Other objects, features and advantages of the present invention will become apparent from reading the following description, given by way of non-limitative illustration, with reference to the appended drawings, which represent.

The elements that have the same function or role with the aim of securing the same result bear the same references in the different figures.

DETAILED DESCRIPTION OF A PREFERRED EMBODIMENT

According to the method of the present invention, in a MLS system, the synchronization of at least one slave stations by a master station is carried out by a supplementary transmitting step of a synchronization data, coded in the form of pulses, of short duration which are clearly different from all other data transmitted by these stations during normal working.

The role of the master station can be performed by any one of the stations of the MLS system (azimuth, elevation, rear azimuth, data . . . ). However, for reasons of covering at transmission, this role is preferably allocated to the azimuth station. The other stations of the MLS are thus slave stations. Two embodiments will be described herein-below with respect to the time of transmitting of this synchronization data with respect to the normal transmission of the MLS functions by the different stations. In the first embodiment, the synchronization data is transmitted at the beginning of each MLS cycle. In the second embodiment it is transmitted at the beginning of each function for each slave stations to be synchronized.

The synchronization data is transmitted either by the sectorial antenna, or by the electronic scanning antenna. When the transmission is performed by the sectorial antenna, the radiation diagram covers both the elevation station and the rear azimuth station. However, the transmission of these synchronization pulses will preferably be transmitted by the electronic scanning antenna, which has a high gain and good directivity.

According to the first embodiment mentioned hereinabove, the synchronization data is transmitted at the beginning of each MLS cycle, upon the same frequency close to 5 GHz. In this case, in order to perform the synchronization of the elevation and rear azimuth stations, for example, from the azimuth station, the electronic scanning antenna must be directed towards each of them every two MLS cycles successively, at the beginning of each of them. Such periodicity is sufficient to the extent that each of the slave stations comprises means for memorizing the order of the sequences within a MLS cycle and means for saving or autonomizing these datas during a time period equivalent to several hundreds of MLS cycles. More generally, in the case of the synchronization of N slave stations by one master station, the scanning antenna is directed towards each of them once out of N beginnings of a MLS cycle.

According to the second embodiment in which the synchronization is performed at the beginning of each function for each of the slave-stations to be synchronized, the synchronization data is transmitted in the same way as set out herein-above, either by the sectorial antenna, or by the electronic scanning antenna. In this case, the scanning antenna is thus directed towards each of the stations to be synchronized at the beginning of each function and transmits a synchronization data. However, since the directivity of the beam is not generally sufficient to address selectively each of the slave stations, it is preferable that the synchronization data thus be coded differently according to the slave stations. The number of codes necessary is equal to the number N of slave stations to be synchronized by the master station.

Therefore, according to the method of the invention, the azimuth station of a MLS transmits, from one of its antenna it has compulsorily in order to fulfill its purpose, a synchronization data coded in the form of at least two pulses, the coding having to be different from that of the MLS data transmitted by the MLS in its normal operation.

Figure 6A:
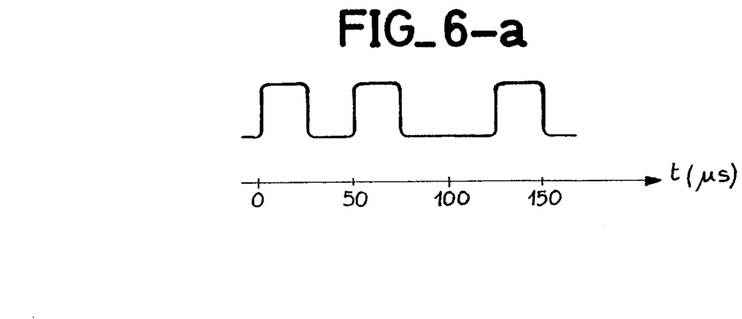
FIGS. 6a & 6b, an example of synchronization signal utilized in the method according to the invention.
Figure 6B:
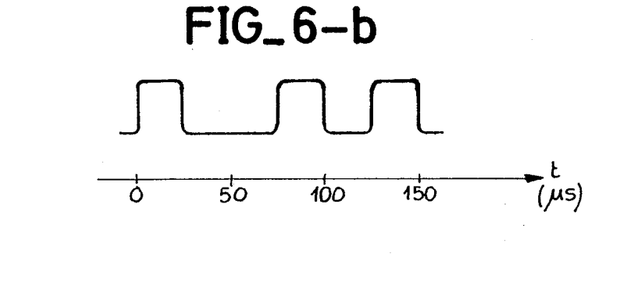

Two examples of synchronization signals are represented in figures 6a and 6b. The synchronization signal uses pulse triplets at the MLS frequency of about 5 GHz, modulated or not in amplitude in an on-off keying. The pulses are identical and have a width l=20 μs so as to distinguish them clearly from the pulses of the scanning beam (50 to 200 μs). The coding is given by the spacing of these three pulses. Two coding examples are given respectively in FIGS. 6a and 6b. The synchronization reference time is, for example, the upward rising front of the first pulse.

It is possible to use synchronization signals in various ways.

Only the signal of 6a, transmitted at the beginning of the MLS cycle of 615 ms is used. The slave stations (elevation or rear azimuth) must thus contain a sequencer that performs the whole of the MLS cycle, in such a way as to make known the allocated time periods.

The signal of FIG. 6a is used for the azimuth-elevation synchronization and the signal of FIG. 6b for the azimuth-rear azimuth synchronization. The appropriate synchronization signal (FIGS. 6a or 6b) is transmitted at the beginning of each function to be synchronized (elevation, rear azimuth) and provokes the transmission of a single function. This system requires more time than the previous one for the synchronization. It also requires a sequencer that performs the MLS cycle, and a logics system in the case of temporary loss of the synchronization signal.

Any intermediary solution between the two previously mentioned solutions can be used, for example through transmitting the signal of FIG. 6a at the beginning of the sequence 1 and the signal of FIG. 6b at the beginning of sequence 2 (cf. FIGS. 2 and 3).

Furthermore, the shape of the pulses must be selected in order to have a short rise time (a few μs) in order to ensure correct synchronization precision and a rounded shape in order to ensure a rapidly decreasing spectrum around the carrier frequency.

The synchronization pulses transmitted by the antenna of the azimuth station, that are of short duration and without preamble—contrary to the other data transmitted by the station—cannot be decoded by the MLS receivers, situated on board the aircraft, which are thus undisturbed by these data (which are of no use to them). Furthermore, these pulses arrive outside the transmission period of the MLS data, so that they do not disturb. Similarly, to the extent that each series of short pulses is only transmitted as most once per transmission of a slave function, they do not have any harmful effect upon the spectrum.

The azimuth station, on the one hand, and the elevation and rear azimuth stations, for example, on the other hand, must be provided with particular means for being able to transmit and receive. These means will be described herein-below.

Figure 7:
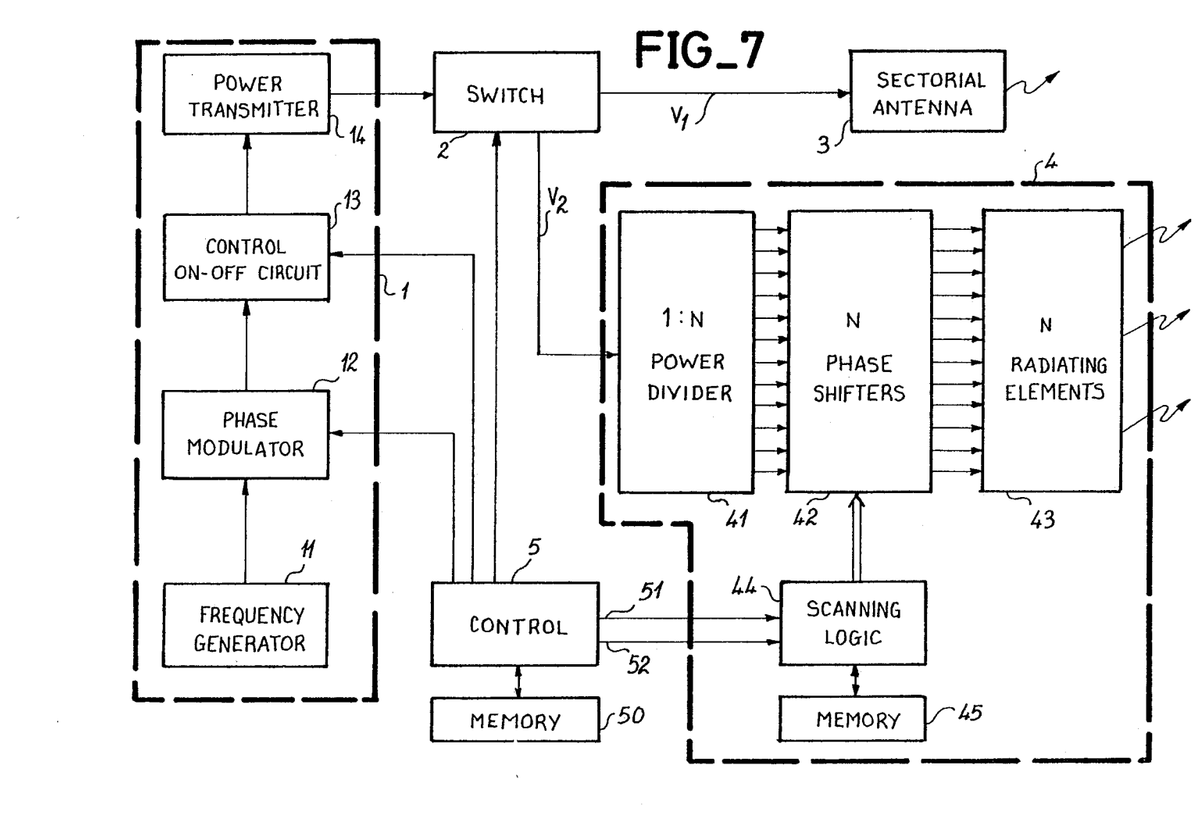
FIG. 7, an embodiment of the device for reducing to practice the invention for transmitting in the case of a MLS.

FIG. 7 represents an embodiment of the device for reducing to practice the invention during transmission, in the case of a MLS station.

This device comprises mainly a transmitter 1, two antennae: a sectorial antenna 3 and an electronic scanning antenna 4, and different control circuits 2, 5.

The transmitter 1 comprises, in series:
a frequency generator 11, consisting, for example, of a frequency synthetizer delivering a wave close to 5 GHz according to the OACI standard (it will be recalled that according to this standard, a frequency among 200 predetermined frequencies, close to 5 GHz is allocated to each MLS station);
a phase modulator 12, performing a DPSK modulation in two states $(0,\pi)$ allowing to transmit the preamble and the datas upon order from a logic control device 5, such as a microprocessor;
an on/off control circuit 13, also controlled by the microprocessor 5;
a power transmitter 14, using electronic tubes or transistors according to the power required, that is conventionally of a value of about 20 W and thus most frequently manufactured by utilizing transistors.

The transmitter 1 delivers a signal, through a switching device 2, either on a channel $V_1$ to the sectorial antenna 3 for the transmission of the preamble and the basic or auxiliary datas, or on a channel $V_2$ to the scanning antenna 4.

The electronic scanning antenna 4 is formed of a power divider (or distributor) 41, dividing the power received from the switch 2 into N in order to supply N digital phase shifters (block 42) which supply N radiating elements (block 43). The phase shifting values introduced by the phase shifters 42 are controlled by a logic scanning circuit 44, in order to perform an electronic scanning from static radiating elements, as is well known. It will be recalled that, if it is desired to transmit a beam (of wavelength λ) forming an angle θ with the normal to the alignment of the radiating elements 43, the phase shifting $\Delta\phi_{\theta,i}$ introduced by a phase shifter of rank i ($1 \leq i \leq N$) is expressed by:

$$\Delta\phi_{\theta,i} = 2\pi i \cdot d/\lambda \cdot \sin\theta$$

in which d is the distance between the two successive radiating elements. The logic scanning circuit 44 is generally a wired circuit, separate from the microprocessor 5 (but this is not compulsory) due to the rapidity required. This circuit 44, upon the "on" order given by the microprocessor 5, performs the control of the phase shifters 42 so as to ensure the desired scanning by successive rapid scanning of the antenna lobe. The positions of the phase shifters 42 for each aiming direction are generally memorized (memory 45) in PROM type memories. The number N of the phase shifters 42 is usually comprised between about 20 and 100.

The device is thus controlled by the microprocessor 5 and its memory 50 (for example of the PROM type) connected to the transmitter 1, to the switch 2 and to the scanning antenna 4, through the scanning logic circuit 44. The microprocessor 5 gives to the scanning logic circuit the "on" signal for the scanning for the elevation of azimuth functions (arrow 51). In the case of azimuth station, the microprocessor 5 further gives aiming order of the scanning beam towards the elevation station during the transmission of the synchronization signal (arrow 52). The MLS cycle, such as represented for example by FIGS. 2 and 3, is contained in the memory 50 of the microprocessor 5.

More specifically, according to one embodiment, a "status word" of the station is defined in the microprocessor 5, each bit of this "status word" representing an order. In the herein-above example, this status word comprises at least six bits, ordering respectively:
the modulator 12,
the on-off circuit 13,
the switch 2;
the scanning logic 44 (2 bits);
the elevation synchronization ($S_s$) in the case of the azimuth station.

Generation in real time of a sequence, such as that represented in FIGS. 4b or 5b, means generating in real time this status word, that thereafter performs the various orders. For this purpose, the succession of the status words corresponding to the sequence desired in disposed in a memory table 50. According to the rhythm of a suitable clock, (64 µs in the present example), the microprocessor 5 will seek the successive status words and deliver them to an interface (not represented) of the Parallel Interface Adapter (PIA) type for example, which controls the various units. It is to be noted that, due to the repetition of certains functions in the same sequence, it is possible to reduce the memory space required by hierarchizing. Therefore, as many tables are memorized as there exists functions, a main table defining the sequence through calling the successive functions.

A MLS generally comprises, on the ground, three stations such as the station shown in FIG. 7, as illustrated on FIG. 1: one station for the azimuth function, one station for the elevation function and one station for the rear azimuth function.

According to the invention, the station which is selected as master station (azimuth station for example) has the contents of its memory 50 modified in order to ensure the supplementary transmission of the synchronization pulses.

Figure 8:
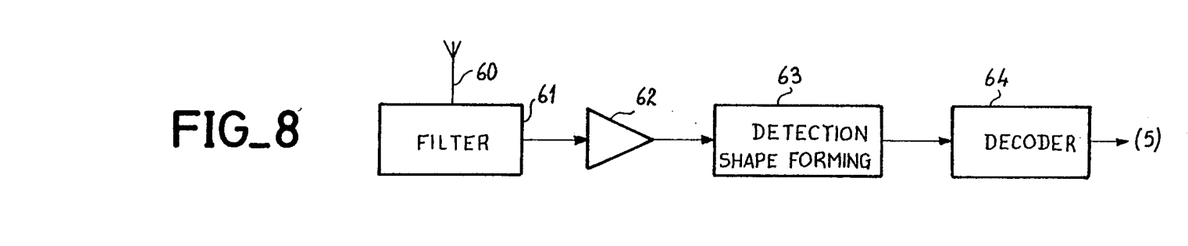
FIGS. 8 and 9, an embodiment of a device for reducing a practice the invention for receiving in the case of a MLS.

FIG. 8 represents an embodiment of supplementary means necessary for reducing to practice the invention in a slave station.

This device comprises, in series:
an antenna 60, intended to receive the radiation of the master station at about 5 GHz;
a band-pass-filter 61, centered upon the previous frequency and followed by an amplifier 62, with the same operating frequency;
a device 63 for detecting the synchronization signal and the shape forming of this signal, with diodes for example;
a device 64 for decoding the synchronization data, that sends a signal giving the synchronization reference time to the control device 5 of the slave station involved.

In a variant embodiment, the filter 61 and amplifier 62 assembly can be replaced by a conventional MLS receiver (superheterodyne 200 channels).

Figure 9:
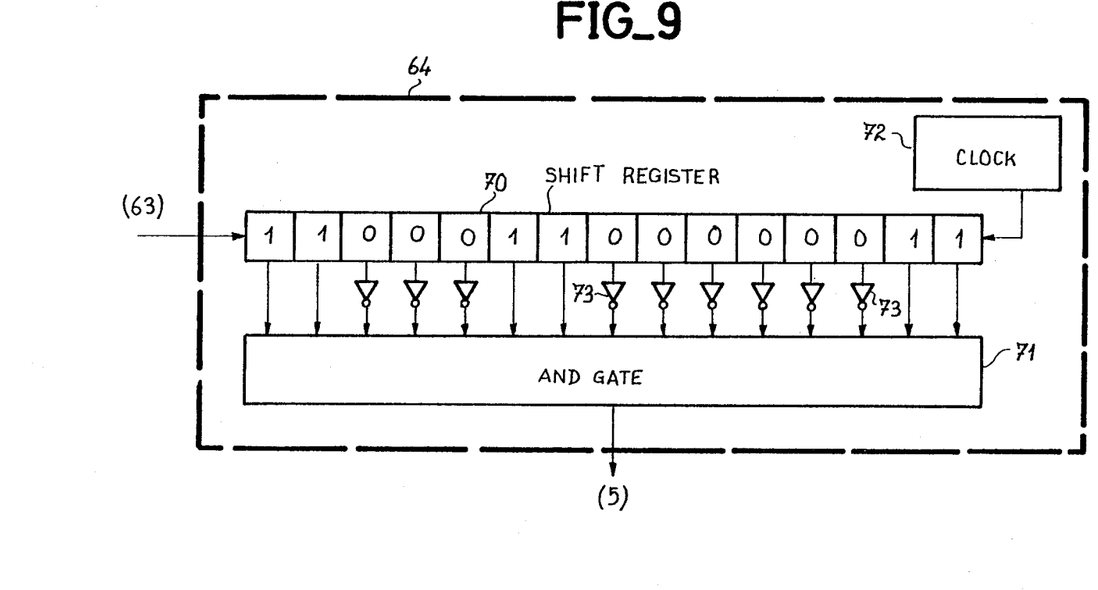

FIG. 9 represents an embodiment of the decoder 64 of FIG. 8, in the event where the synchronization data is in the form of three pulses as represented in FIG. 6a.

This decoder comprises a shift register 70, controlled by a clock 72 having a frequency equal to 100 kHz. This shift register comprises 15 positions which allow it to decode a signal, received from the detector 63, of 0.15 ms.

Each of the positions of register 70 is connected to an AND logic gate 71, through the intermediary of an inverter 73 where necessary. The programming of the message to be decoded is made by the positioning of the inverters 73. The AND gate 71 thus performs the correlation between the awaited message and the message received. Its output is only at 1 when the message received is correct. This output supplies the synchronization reference time to the control device 5.

Figure 10:
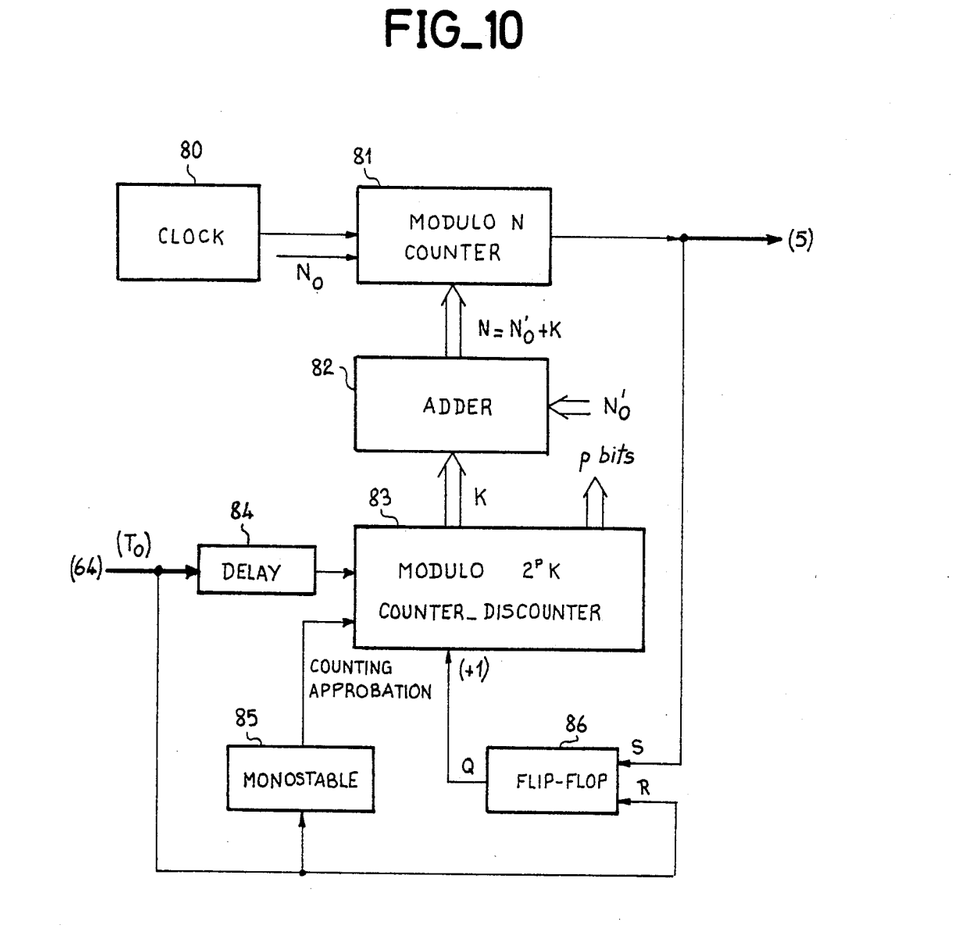
FIG. 10, an improvement of the invention.

FIG. 10 represents an improvement made to the operating of the slave station in the event where an accidental and temporary shut-down of the radio-electric link between the master station and the slave-station has occurred. Such a shut-down can be due simply to the presence of a moving obstacle (the passage of a heavy freight aircraft, for example).

The device represented in FIG. 10 is a clock system (clock 80 and counter 81) in frequency controlled by the synchronization signal received from the decoder 64. This device is designed in such a way that it delivers a signal towards the control circuit 5, even in the absence of a signal received from the decoder 64.

With this purpose in mind, this device comprises:
a clock 80, having good stability in time and high operation frequency in order to have good precision in performing the frequency control. A time controlled quartz oscillator giving a precision in the order of $10^{-6}$ can be used;
a modulo N counter 81, for generating a signal of period $T_o = 615$ ms which is the duration of a MLS cycle. If a clock of period $\tau = 0.1$ µs is used, a number $N_o$ of counting such that $N_o = 0.615 \times 10^7$ is obtained.

In order to take into account a possible drift of clock 80 in time, due for example to temperature variations, the number N will be chosen different from $N_o$, the change of one unit of the number N thus corresponding to a frequency variation of $\pm 1.63 \cdot 10^7$.

To do this, the following are used:
a RS type flip-flop 86, acting as phase discriminator. The output state of this flip-flop is representative of the phase advance of one of the signals that it receives with respect to the other, i.e. the input signal (issuing from the device 64) and the output signal (issuing from the counter 81);

a modulo $2^pK$ counter-discounter 83. The output comprises p least significant bits, that are not taken into account, and most significant bits that represent a number K. This counter-discounter 83 has its contents varied by $\pm 1$ at each period $T_o$ in function of the relative phase of the input signal 64 and the output signal 81. However, it is necessary to have successively $2^p$ times the value $+1$ in order to cause K to vary by $\pm 1$: this corresponds to a low-pass feedback filtering effect;

an adder 82 performing the total $N=N'_o+K$, with $N'_o$ a fixed value corresponding to the lowest value of N to be considered, corresponding to the extreme clock frequency to be compensated, i.e.

$$N_o = N'_o + (K_o/2)$$

$K_o$ being the maximum contents of the counter-discounter 83.

The circuit such as described herein-above thus performs a phase control (and thus a frequency control) of the output (towards circuit 5) by the input (issuing from the circuit 64). A monostable 85 connected between the input and the counter-discounter 83 sends a counting-discounting order to the element 83 during a lapse of time equal to its period. This period ($T_M$) being selected so that $T_o < T_M < 2T_o$, it appears that if the signal is received permanently upon the input, the control system operates. But if nothing is received, the control system is cut-out after the first missing pulse. The circuit thus maintains in memory the last value of N and continues to deliver a signal of period $T_o$ to the device 5.

Furthermore, the circuit represented in FIG. 10 comprises an initialization order of counter 81 at a value of $N=N_o$ and a delay element 84, connected between the input of the circuit and the input of the counter-discounter 83, intended to compensate or set off the delays undergone by the input signal in the flip-flop 86.

We claim:

1. A method for the radioelectric synchronization of at least one slave station by a master station in a data communication system, comprising:
    a plurality of successive steps of data transmission by said stations, with said steps constituting a cycle, the method comprising a supplementary radioelectric transmission steps by said master station of a synchronization data coded in the form of at least two successive pulses and wherein said coding is performed through the spacings between said pulses, and further wherein, said synchronization data being periodically transmitted, at least once per cycle.

2. A device for reducing the radioelectric synchronization of at least one slave station by a master station in a data communication system, said slave station comprising:
    at least one antenna;
    transmitting means, delivering data for said communication system to be transmitted by said antenna;
    controlling means for the sequencing of the transmissions of said slave station;
    a receiving antenna for receiving a synchronization data from said master station, said synchronization data being coded in the form of at least two successive pulses and being periodically transmitted, at least once per cycle;
    receiving and detecting means for said synchronization data;
    means for decoding the signal issuing from said receiving and detecting means and delivering a synchronization signal giving the synchronization time, to the said controlling means.

3. A device according to claim 2, wherein said receiving and detecting means comprise a filter and a detection and shape forming circuit.

4. A device according to claim 2, wherein said decoding means comprise a shift register connected to an AND gate through inverters, disposed at certain outputs of the different positions of the register according to the configuration of the synchronization pulses to be decoded.

5. A device according to claim 2, further comprising means for generating the synchronization signal in the absence of receiving synchronization data from said master station, said generating means being positioned between said decoding means and said controlling means said generating means comprising a clock system frequency controlled by said synchronization data when it exists, delivering the synchronization signal to said control means.

6. A method for the radioelectric synchronization of at least one slave station by a master station in a data communication system, wherein said master station has a sectorial antenna and an electronic scanning antenna comprising:
    a plurality of successive steps of data transmission by said stations, with said steps constituting a cycle, the method comprising a supplementary radioelectric transmission steps by said master station of a synchronization data coded in the form of at least two successive pulses with each successive step being a MLS function and said synchronization transmitted on the transmission frequency of the MLS functions and with a different characteristic and transmitted by said electronic scanning antenna directed successively towards each of the slave stations.

7. A method for the radioelectric synchronization of at least one slave station by a master station in a data communication system, comprising:
    a plurality of successive steps of data transmission by said stations, with said steps constituting a cycle, the method comprising a supplementary radioelectric transmission steps by said master station of a synchronization data coded in the form of a series of three successive pulses, said synchronization data being periodically transmitted, at least once per cycle.

* * * * *